US011193569B1

(12) United States Patent
Nelson et al.

(10) Patent No.: US 11,193,569 B1
(45) Date of Patent: Dec. 7, 2021

(54) TWO-PASS TORQUE CONVERTER WITH A FLOW CONTROL ASSEMBLY

(71) Applicant: Schaeffler Technologies AG & Co. KG, Herzogenaurach (DE)

(72) Inventors: Kyle Nelson, Wadsworth, OH (US); Victor Norwich, Wooster, OH (US)

(73) Assignee: Schaeffler Techologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/117,586

(22) Filed: Dec. 10, 2020

(51) Int. Cl.
*F16H 45/02* (2006.01)

(52) U.S. Cl.
CPC ..... *F16H 45/02* (2013.01); *F16H 2045/0205* (2013.01); *F16H 2045/0294* (2013.01)

(58) Field of Classification Search
CPC .......................... F16H 2045/0205–021; F16H 2045/0273–0294
See application file for complete search history.

(56) References Cited

U.S. PATENT DOCUMENTS

| | | | |
|---|---|---|---|
| 6,332,516 B1 * | 12/2001 | Arhab | F16H 41/24 192/3.29 |
| 6,725,988 B2 * | 4/2004 | Bauer | F16H 45/02 192/200 |
| 8,151,957 B2 * | 4/2012 | Hoffmann | F16H 45/02 192/3.3 |
| 8,348,037 B2 * | 1/2013 | Carrier | F16H 45/02 192/3.3 |
| 8,839,923 B2 * | 9/2014 | Greathouse | F16H 45/02 192/3.29 |
| 2009/0139819 A1 * | 6/2009 | Jameson | F16H 45/02 192/3.29 |
| 2020/0284331 A1 | 9/2020 | Hoff et al. | |

* cited by examiner

*Primary Examiner* — Ernesto A Suarez
*Assistant Examiner* — James J Taylor, II

(57) ABSTRACT

A two-pass torque converter, including: a cover arranged to receive torque; an impeder including an impeller shell connected to the cover and at least one impeller blade fixedly connected to the impeller shell; a turbine including a turbine shell and at least one turbine blade fixedly connected to the turbine shell; a lock-up clutch including a piston plate; and a flow control assembly including a first seal and a spring connected to the first seal and urging the first seal toward one of the cover or the piston plate. The cover, the piston plate, and the flow control assembly define, at least partly, a release pressure chamber. The cover, the impeller shell, the piston plate, and the flow control assembly define, at least partly, an apply pressure chamber.

20 Claims, 9 Drawing Sheets

TWO-PASS TORQUE CONVERTER WITH A FLOW CONTROL ASSEMBLY

TECHNICAL FIELD

The present disclosure relates to a two-pass torque converter with a flow control assembly for controlling flow of pressurized fluid between pressure chambers for a lock-up clutch.

BACKGROUND

For a lock-up clutch of a known two-pass torque converter, unregulated fluid flow between pressure chambers can hamper the transition from a clutch open mode to a clutch closed mode.

SUMMARY

According to aspects illustrated herein, there is provided a two-pass torque converter, including: a cover arranged to receive torque; an impeller including an impeller shell connected to the cover and at least one impeller blade fixedly connected to the impeller shell; a turbine including a turbine shell and at least one turbine blade fixedly connected to the turbine shell; a lock-up clutch including a piston plate; and a flow control assembly including a first seal and a spring connected to the first seal and urging the first seal toward one of the cover or the piston plate. The cover, the piston plate, and the flow control assembly define, at least partly, a release pressure chamber. The cover, the impeller shell, the piston plate, and the flow control assembly define, at least partly, an apply pressure chamber.

According to aspects illustrated herein, there is provided a two-pass torque converter, including: a cover arranged to receive torque; an impeller including an impeller shell connected to the cover and at least one impeller blade fixedly connected to the impeller shell; a turbine including a turbine shell and at least one turbine blade fixedly connected to the turbine shell; a lock-up clutch including a piston plate; an output element arranged to non-rotatably connect to a transmission input shaft; and a flow control assembly axially disposed between the cover and the piston plate and including a first seal and a spring connected to the first seal and urging the first seal toward one of the cover or the piston plate. The cover, the flow control assembly, and the piston plate define, at least partly, a release pressure chamber. The cover, the impeller shell, the piston plate, and the flow control assembly define, at least partly, an apply pressure chamber. In a clutch closed mode of the two-pass torque converter: the torque is arranged to be transmitted from the cover to the output element via the lock-up clutch; the first seal is arranged to seal against the one of the cover or the piston plate; and a fluid in the apply pressure chamber is arranged to flow through a gap between the flow control assembly and another of the cover or the piston plate, and into the release pressure chamber.

According to aspects illustrated herein, there is provided a method of operating a two-pass torque converter including a cover, an impeller with an impeller shell connected to the cover, a turbine with a turbine shell, a lock-up clutch including a piston plate and friction material axially disposed between the cover and the piston plate, an output element, and a flow control assembly including a spring, a first seal connected to the spring, and a second seal connected to the spring. The method includes: receiving, with the cover, a rotational torque; for a clutch open mode, holding the lock-up clutch open with a fluid in a release pressure chamber defined at least in part by the cover, the flow control assembly, and the piston plate, and transmitting the rotational torque from the cover to the output element via the impeller and the turbine; for a clutch closed mode, holding the lock-up clutch closed with a fluid in an apply pressure chamber, the apply pressure chamber defined at least in part by the cover, the impeller shell, the piston plate, and the flow control assembly, and transmitting the rotational torque from the cover to the output element via the lock-up clutch. For a first stage of a transition from the clutch open mode to the clutch closed mode: flowing out at least a portion of the fluid in the release pressure chamber; flowing a fluid from a first portion of the apply pressure chamber into a second portion of the apply pressure chamber, the first portion of the apply pressure chamber defined at least in part by the impeller shell and the friction material, and the second portion of the apply pressure chamber defined, at least in part, by the cover, the friction material, the piston plate, and the flow control assembly; blocking, with the first seal and the second seal, a flow of the fluid in the second portion of the apply pressure chamber into the release pressure chamber; and displacing, with the fluid in the first portion of the apply pressure chamber, the piston plate toward the cover.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course vary. It is also understood that the terminology used herein is for the purpose of describing particular aspects only and is not intended to limit the scope of the present disclosure.

Unless defined otherwise, all technical and scientific terms used herein have the same meaning as commonly understood to one of ordinary skill in the art to which this disclosure belongs. It should be understood that any methods, devices, or materials similar or equivalent to those described herein can be used in the practice or testing of the disclosure.

Figure 1:
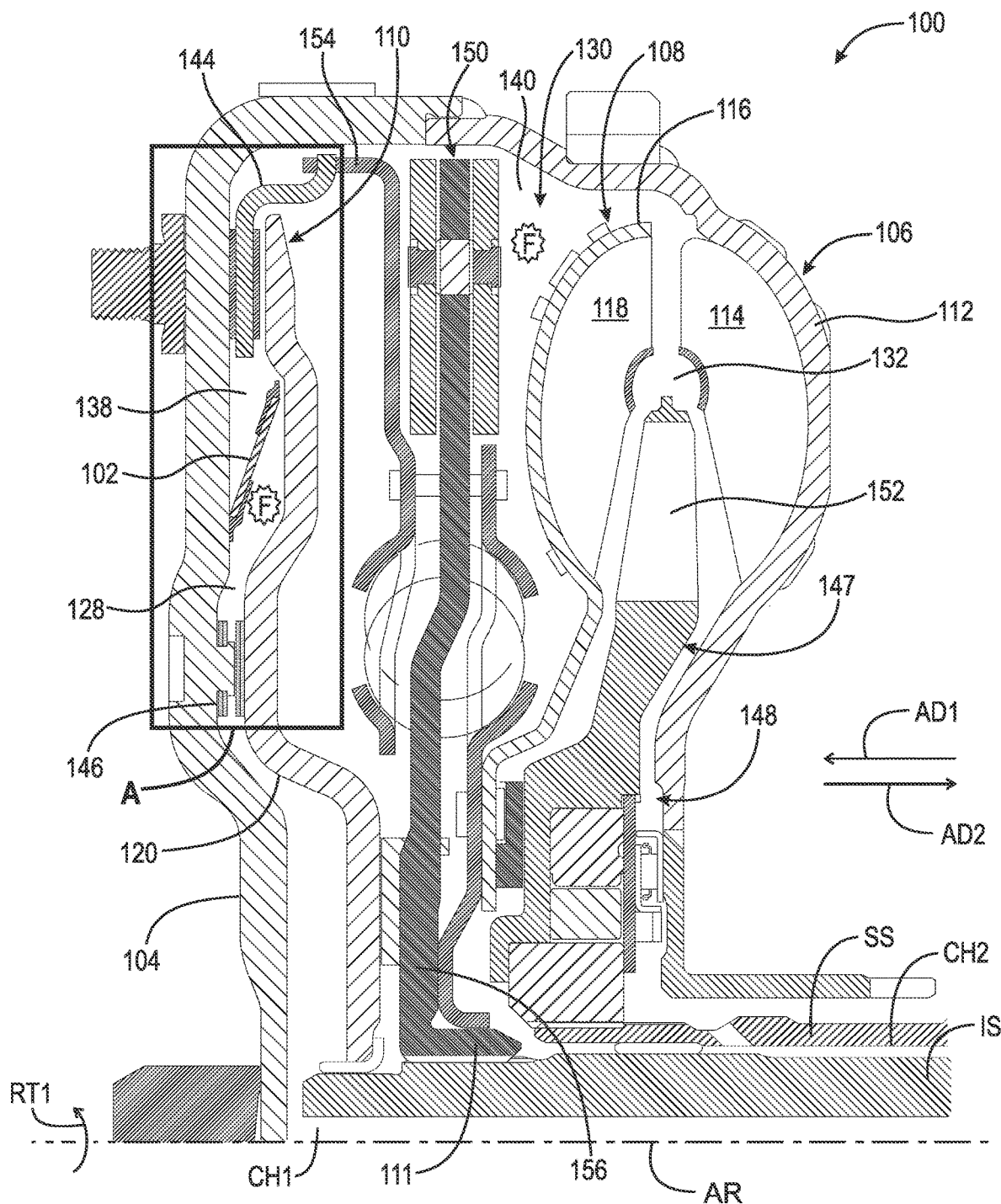
FIG. 1 is a partial cross-sectional view of a two-pass torque converter, with a flow control assembly, in a clutch open mode.

FIG. 1 is a partial cross-sectional view of two-pass torque converter 100, with flow control assembly 102, in a clutch open mode.

Figure 2:
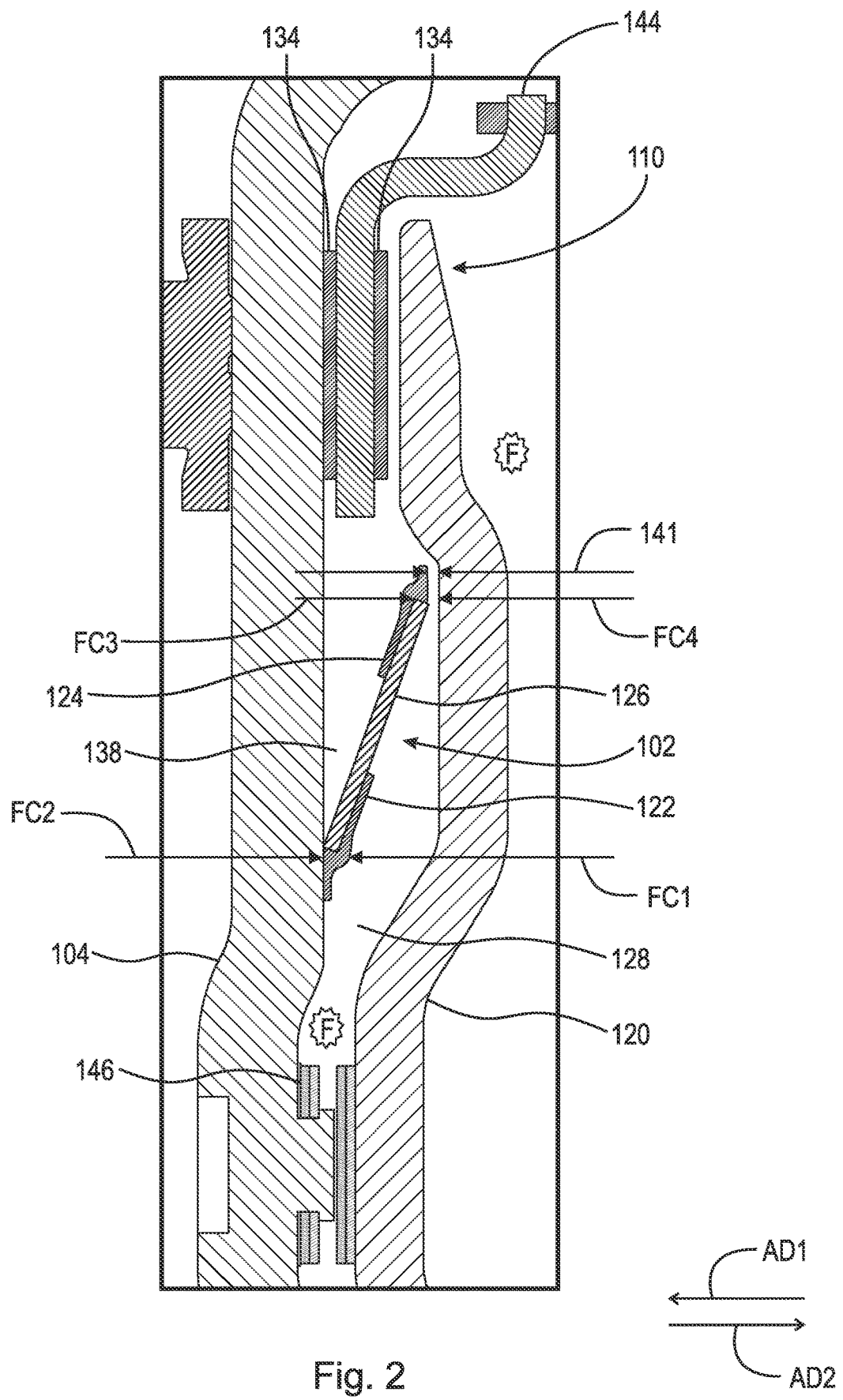
FIG. 2 is a detail of area A in FIG. 1.

FIG. 2 is a detail of area A in FIG. 1. The following should be viewed in light of FIGS. 1 and 2. Torque converter 100 includes: cover 104 arranged to receive rotational torque RT; impeller 106; turbine 108; lock-up clutch 110; and output element 111 arranged to non-rotatably connect to transmission input shaft IS. Impeller 106 includes: impeller shell 112 non-rotatably connected to cover 104; and at least one impeller blade 114 fixedly connected to impeller shell 112. Turbine 108 includes: turbine shell 116; and at least one turbine blade 118 fixedly connected to turbine shell 116. Lock-up clutch 110 includes axially displaceable piston plate 120. Flow control assembly 102 is axially disposed between cover 104 and piston plate 120 and includes: seal 122; seal 124; and spring 126. Seals 122 and 124 are directly connected to spring 126. In the example of FIG. 1, Seals 122 and 124 are fixedly connected to spring 126. Spring 126 is preloaded to: urge seal 122 toward cover 104; and urge seal 124 toward piston plate 120.

Seals 122 and 124 can be any resilient seals known in the art. In the example of FIG. 1, seal 122 is radially inward of seal 124. In an example embodiment, seal 122 and seal 124 are each circumferentially continuous. In an example embodiment, spring 126 is circumferentially continuous. Spring 126 can be any spring known in the art capable of urging seals 122 and 124 as noted above.

Cover 104, flow control assembly 102, and piston plate 120 define, at least partly, release pressure chamber 128. Cover 104, impeller shell 112, piston plate 120, and flow control assembly 102 define, at least partly apply pressure chamber 130. Flow control assembly 102 separates release pressure chamber 128 and apply pressure chamber 130. Flow control assembly 102 is arranged to control a flow of fluid F between release pressure chamber 128 and apply pressure chamber 130 in response to a pressure of fluid F in chamber 128 and a pressure of fluid F in chamber 130, for example, in response to a difference between the pressure of fluid F in chamber 128 and the pressure of fluid F in chamber 130.

In the clutch open mode of two-pass torque converter 100: cover 104 is arranged to transmit torque RT to output element 111 via impeller 106 and turbine 108; and the pressure of fluid F in release pressure chamber 128 is greater than the pressure of fluid F in apply pressure chamber 130. The pressure differential between release pressure chamber 128 and apply pressure chamber 130 holds clutch 110 open.

Figure 3:
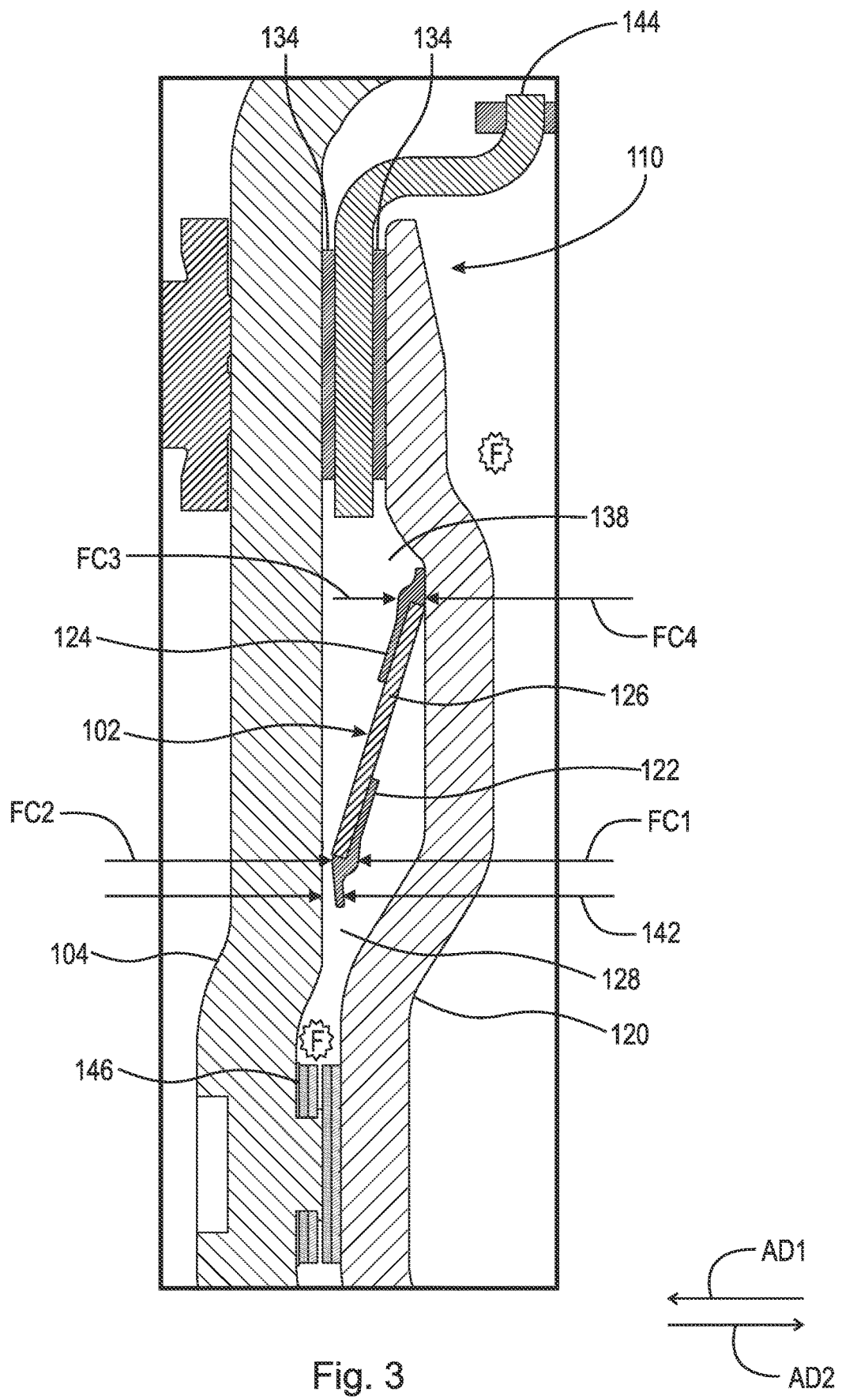
FIG. 3 is a detail of area A in FIG. 1 with the two-pass torque converter in a clutch closed mode.

FIG. 3 is a detail of area A in FIG. 1 with two-pass torque converter 100 in a clutch closed mode. The following should be viewed in light of FIGS. 1 through 3. In the clutch closed mode of two-pass torque converter 100: cover 104 is arranged to transmit torque RT to output element 111 via lock-up clutch 110; and the pressure of fluid F in apply pressure chamber 130 is greater than the pressure of fluid F in release pressure chamber 128, which clamps clutch 110 closed.

In the clutch open mode, fluid F is arranged to flow into release pressure chamber 128, past flow control assembly 102, and into apply pressure chamber 130 to provide cooling for torus 132, formed by impeller 106 and turbine 108. In the clutch open mode: fluid F is arranged to flow into chamber 128, between seal 124 and piston plate 120, and into apply pressure chamber 130; and seal 122 is arranged to seal against cover 104 to block flow of fluid F from release pressure chamber 128, between cover 104 and seal 122, and into apply pressure chamber 130.

In the clutch closed mode, fluid F is arranged to flow into apply pressure chamber 130, past flow control assembly 102, and into release pressure chamber 128 to provide cooling of clutch 110. In the clutch closed mode: fluid F is arranged to flow into apply pressure chamber 130, between seal 122 and cover 104, and into release pressure chamber 128; and seal 124 is arranged to seal against piston plate 120 to block flow of fluid F from apply pressure chamber 130, between seal 124 and piston plate 120, and into release pressure chamber 128.

Figure 4:
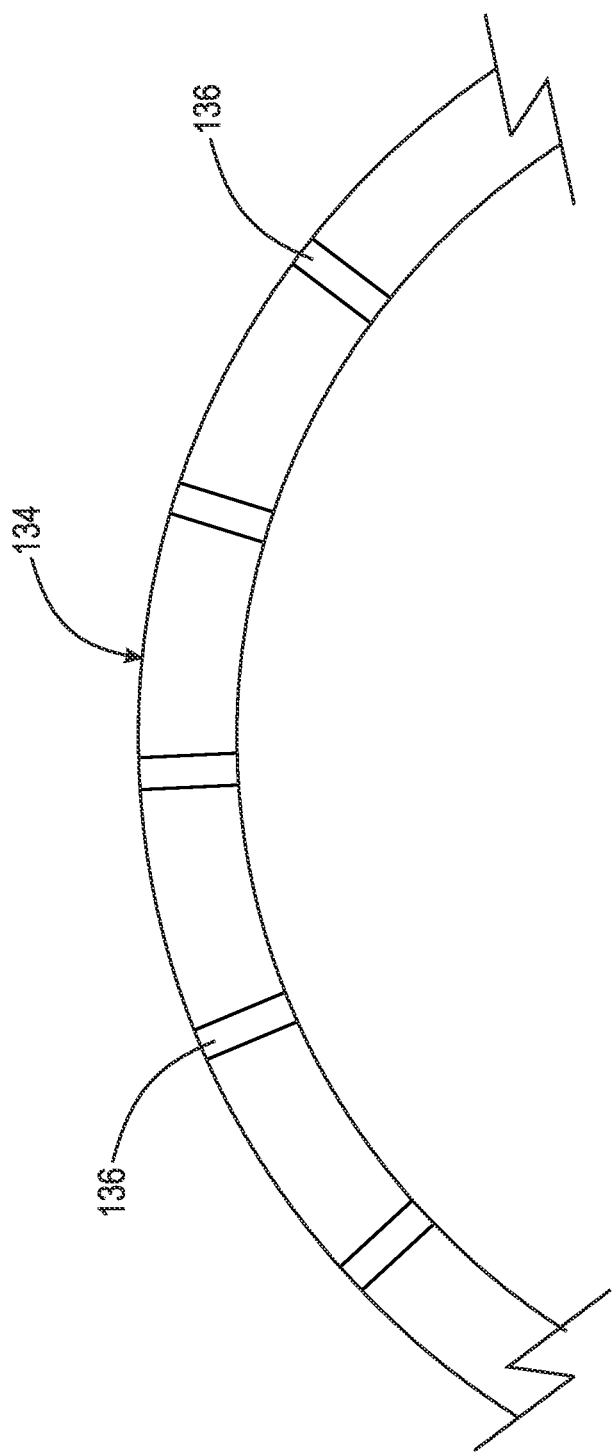
FIG. 4 is a front view detail of friction material shown in FIG. 1.

FIG. 4 is a front view detail of friction material 134 shown in FIG. 1. Lock-up clutch 110 includes friction material 134: axially disposed between cover 104 and piston plate 120; located radially outward of flow control assembly 102; including at least one slot 136; and arranged to non-rotatably connect with cover 104 and piston plate 120 in the clutch closed mode.

By "non-rotatably connected" components, we mean that components are connected so that whenever one of the components rotates, all the components rotate; and relative rotation between the components is precluded. Radial and/or axial movement of non-rotatably connected components with respect to each other is possible. Components connected by tabs, gears, teeth, or splines are considered as non-rotatably connected despite possible lash inherent in the connection. The input and output elements of a closed clutch are considered non-rotatably connected despite possible slip in the clutch. The input and output parts of a vibration damper, engaged with springs for the vibration damper, are not considered non-rotatably connected due to the compression and unwinding of the springs. Without a further modifier, the non-rotatable connection between or among components is assumed for rotation in any direction. However, the non-rotatable connection can be limited by use of a modifier. For example, "non-rotatably connected for rotation in circumferential direction CD1," defines the connection for rotation only in circumferential direction CD1.

Cover 104, friction material 134, piston plate 120, and flow control assembly 102 define, at least in part: portion 138 of apply pressure chamber 130. Cover 104, impeller shell 112, piston plate 120, and friction material 134 define, at least in part, portion 140 of apply pressure chamber 130. In the clutch open mode, fluid F is arranged to flow: from release pressure chamber 128; through gap 141 between seal 124 and piston plate 120; and into portion 138. In the clutch open mode, flow control assembly enables flow of fluid F through gap 141 to cool torus 132, while providing the structure and functionality to block close gap 141 as needed for the clutch closed mode.

In the clutch closed mode, fluid F is arranged to flow: from portion 140; through at least one slot 136; through portion 138, around flow control assembly 102, and into release pressure chamber 128. In particular, fluid F is arranged to flow from portion 138, between seal 122 and cover 104, and into release pressure chamber 128. In the clutch closed mode, flow control assembly 102 is arranged to reduce the fluid pressure of fluid F flowing from portion 138 into release pressure chamber 128. For example, flowing fluid F through gap 142 between seal 122 and cover 104 constricts the flow from portion 138 into release pressure chamber 128 and reduces the pressure of fluid F flowing through gap 142 and into release pressure chamber 128.

In the example of FIG. 1, spring 126 is a diaphragm spring, and seals 122 and 124 are lip seals. Preloading of spring 126 and fluid pressure, due to fluid F in release pressure chamber 128, urge seal 122 in axial direction AD1, parallel to axis of rotation AR, with force FC1. Fluid pressure due to fluid F in portion 138, generates force FC2, opposite force FC1, urging seal 122 in axial direction AD2, opposite direction AD1. Seal 122 remains in contact with and sealed against cover 104 when force FC1 is greater than force FC2.

Preloading of spring 126 and fluid pressure, due to fluid F, in portion 138, urge seal 124 in axial direction AD2 with force FC3. Fluid pressure, due to fluid F in release pressure chamber 128, generates force FC4, opposite force FC3, urging seal 124 in direction AD1. Seal 124 remains in contact with and sealed against piston plate 120 when force FC3 is greater than force FC4.

Figure 5:
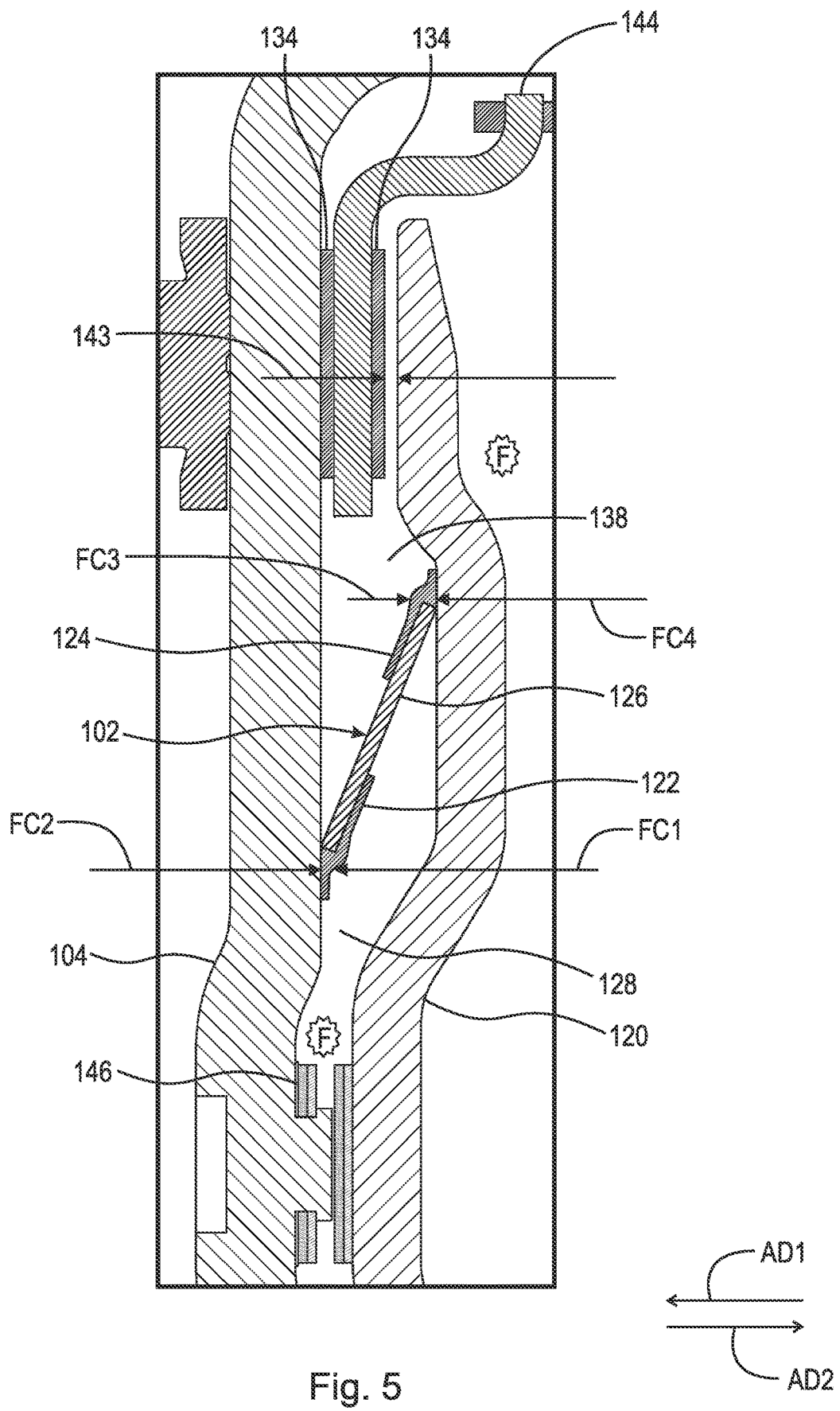
FIG. 5 is a detail of area A in FIG. 1 with the two-pass torque converter in a transition from the clutch open mode to the clutch closed mode.

FIG. 5 is a detail of area A with two-pass torque converter 100 in a transition from the clutch open mode to the clutch closed mode. The following should be viewed in light of FIGS. 1 through 5. A minimum fluid pressure differential between pressure chambers is needed to transition from a clutch open mode to a clutch closed mode of a lock-up clutch in a torque converter. An unregulated flow of fluid, from a pressure apply chamber to a pressure release chamber, during the process of closing the lock-up clutch can hamper creation of the pressure differential. For example, if flow control assembly 102 is removed from torque converter 100, at the start of the transition from the clutch open mode to the clutch closed mode, fluid F would flow too rapidly into chamber 128, pressurizing chamber 128 and minimizing a fluid pressure differential between chamber 128 and chamber 130 before gap 143, between piston plate 120 and friction material 134, is narrowed enough to reduce the flow of fluid F into chamber 128, This problem is exacerbated if piston plate 120 is displaced to a full extent in direction AD2 (gap 143 is maximized) at the start of the transition from the clutch open mode to the clutch closed mode. The absence of, or delay in forming, the fluid pressure differential between chambers 128 and 130 would interfere with a predictable, repeatable and controlled transition to the clutch closed mode.

In torque converter 100, for the transition from the clutch open mode to the clutch closed mode, flow control assembly 102 provides a controlled flow of fluid F from chamber 130 into chamber 128, such that pressure in release pressure chamber 128 remains low enough to ensure an optimal fluid pressure differential between chambers 128 and 130, and to ensure a predictable, repeatable, and controlled displacement of piston plate 120 in direction AD1, and transition to the clutch closed mode. In addition, when force FC2, from fluid pressure in portion 138, overcomes force FC1, as described below, gap 142 opens and fluid F flows through gap 142, preventing excessive fluid pressure build-up in portion 138, and enabling flow of fluid F through gap 142 into release pressure chamber 128 to cool clutch 110.

The following discussion presents example pressures solely for the purpose of illustrating a transition from the clutch open mode to the clutch closed mode of torque converter 100. It is understood that torque converter 100 is not limited to these pressures and that other pressures are possible in torque converter 100. The transition from the clutch open mode to the clutch closed mode occurs substantially as follows:

1. Starting from FIG. 2 (torque converter 100 is in a steady state clutch open mode) fluid F flows through channel CH1 of input shaft IS, into release pressure chamber 128, through gap 141, into portion 138, and through gap 143 into portion 140. Fluid pressure in release pressure chamber 128 is 8 bar and fluid pressure in apply pressure chamber 130 is 7.5 bar.
2. Chamber 128 is depressurized to approximately zero bar by reversing the flow of fluid F from CH1. Fluid F flows into apply pressure chamber 130 from channel CH2, formed by input shaft IS and stator shaft SS.
3. Staying in FIG. 2, due to loss of fluid pressure in release pressure chamber 128, spring force FC3 overcomes force FC4, closing gap 141, resulting in the configuration of FIG. 5.
4. In FIG. 5, fluid F flows from portion 140 through gap 143 and into portion 138 with little resistance.
5. Flow of fluid F from portion 138 into release pressure chamber 128 is blocked by seal 122 and force FC1, and by force FC3 and seal 124. Thus, fluid pressure builds in portion 138, gap 143 remains open, and fluid pressure in release pressure chamber 128 remains approximately zero.
6. Staying in FIG. 5, when pressure in portion 138 builds up to the point where force FC2 equals force FC1, and pressure in release pressure chamber 128 remains approximately zero bar, the fluid pressure differential between chambers 128 and 130 continues to displace piston 120 in direction AD1 with up to a pressure differential of 0.5 bar to close gap 143 in clutch 110.
7. Seal 122 remains sealed against cover 104 until fluid pressure in portion 138 reaches 0.5 bar at which point force FC2 overcomes force FC1 from spring 126, forming gap 142 as shown in FIG. 3.
8. Fluid F flows from portion 140, through slots 136, through portion 138, through gap 142, through release pressure chamber 128, and into channel CH1 of input shaft IS. Clutch 110 is now in steady state clutch closed mode. of FIG. 3.
9. The flow of fluid F into from portion 138 into release pressure chamber 128 is constricted by gap 142, creating a fluid back pressure at the interface of portion 140 and friction material 134, which creates a maximum fluid pressure in portion 140, clamping clutch 110 closed and enabling full transmission of torque RT to output element 111. Fluid pressure in release pressure chamber 128 remains at approximately zero bar fluid pressure in portion 138 is 0.5 bar and fluid pressure in portion 140 is 8 bar.

Flow control assembly 102, in particular force FC1 generated by spring 126, can be tuned to create and operate in selected fluid pressure ranges. For example, in the initial stage of the transition from the clutch open mode to the clutch closed mode, spring 126 and force FC1 block flow of fluid F from portion 138 to release pressure chamber 128, enabling fluid pressure in release pressure chamber 128 to remain low, and enabling a selected fluid pressure differential between portion 140 and release pressure chamber 128. Then, to prevent an excess of fluid pressure in portion 138, which would act against displacement of piston plate 120 in direction AD1, when the fluid pressure in portion 138 generates force FC2, gap 141 is opened, limiting the fluid pressure build-up in portion 138. Thus, force FC1 is selectable to enable the selected fluid pressure build-up in portion 138 while preventing excess pressure in portion 138.

In the example of FIG. 1: clutch 110 includes outer clutch plate 144 and leaf spring 146; and two-pass torque converter 100 includes stator 147, one-way clutch 148, and pendulum vibration damper 150. Spring 146 non-rotatably connects cover 104 and piston plate 120. Leaf spring 146 can be configured to bias piston plate 120 toward or away from cover 104. Stator 147 includes at least one stator blade 152 axially disposed between blades 114 and 118. Damper 150 includes input element 154 and output flange 156. Output flange 156 includes output element 111. Turbine shell 116 is non-rotatably connected to damper 150. A portion of plate 144 is axially disposed between cover 104, piston plate 120 and friction material 134. Plate 144 is non-rotatably connected to input element 154. In the clutch open mode, torque is transmitted from cover 104 to output element 111 via impeller 106, turbine 108, and damper 150. In the clutch closed mode, torque is transmitted from cover 104 to output element 111 via plate 144 and damper 150.

Figure 6:
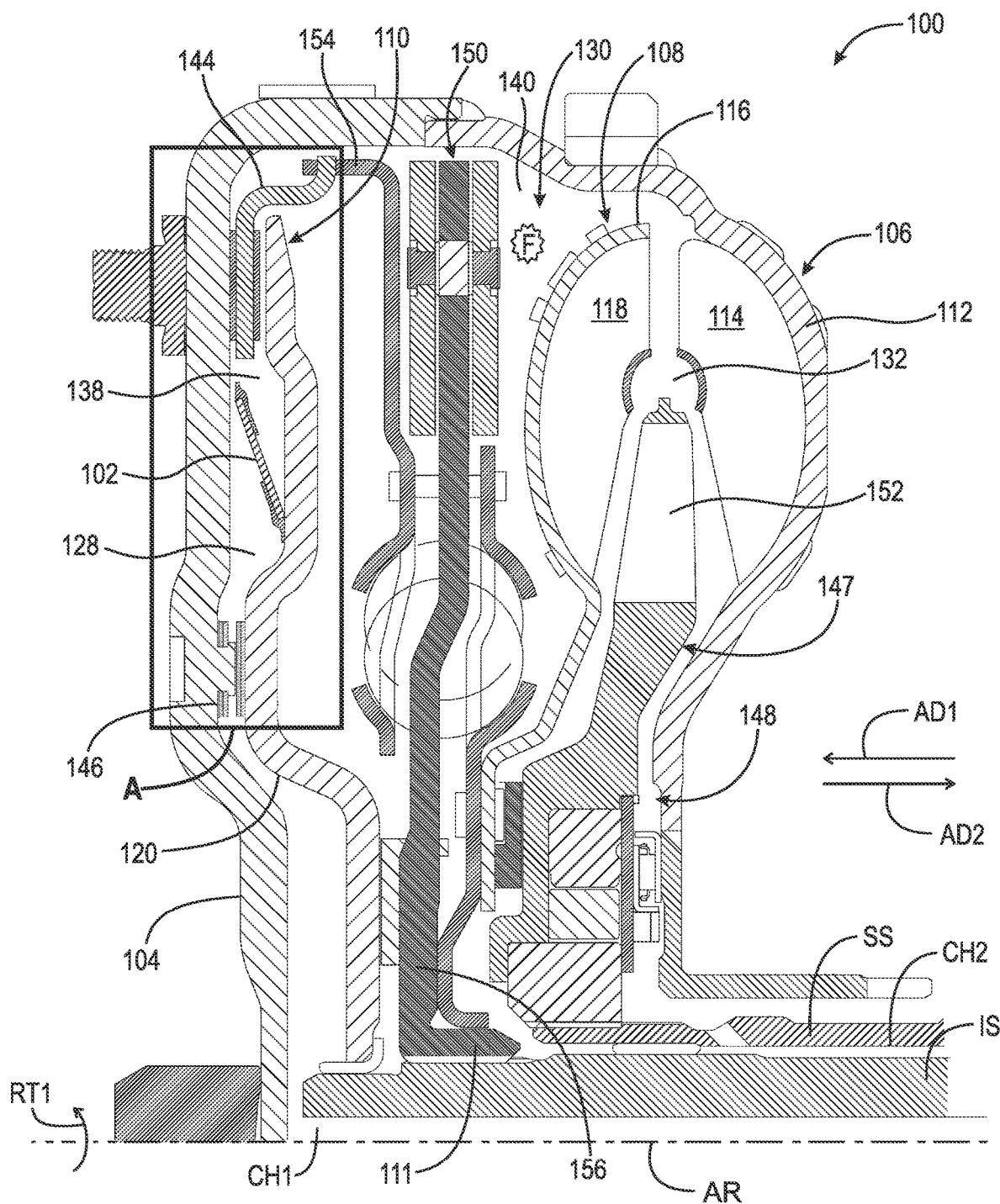
FIG. 6 is a partial cross-sectional view of a two-pass torque converter, with a flow control assembly, in the clutch open mode.

FIG. 6 is a partial cross-sectional view of two-pass torque converter 100, with flow control assembly 102, in the clutch open mode.

Figure 7:
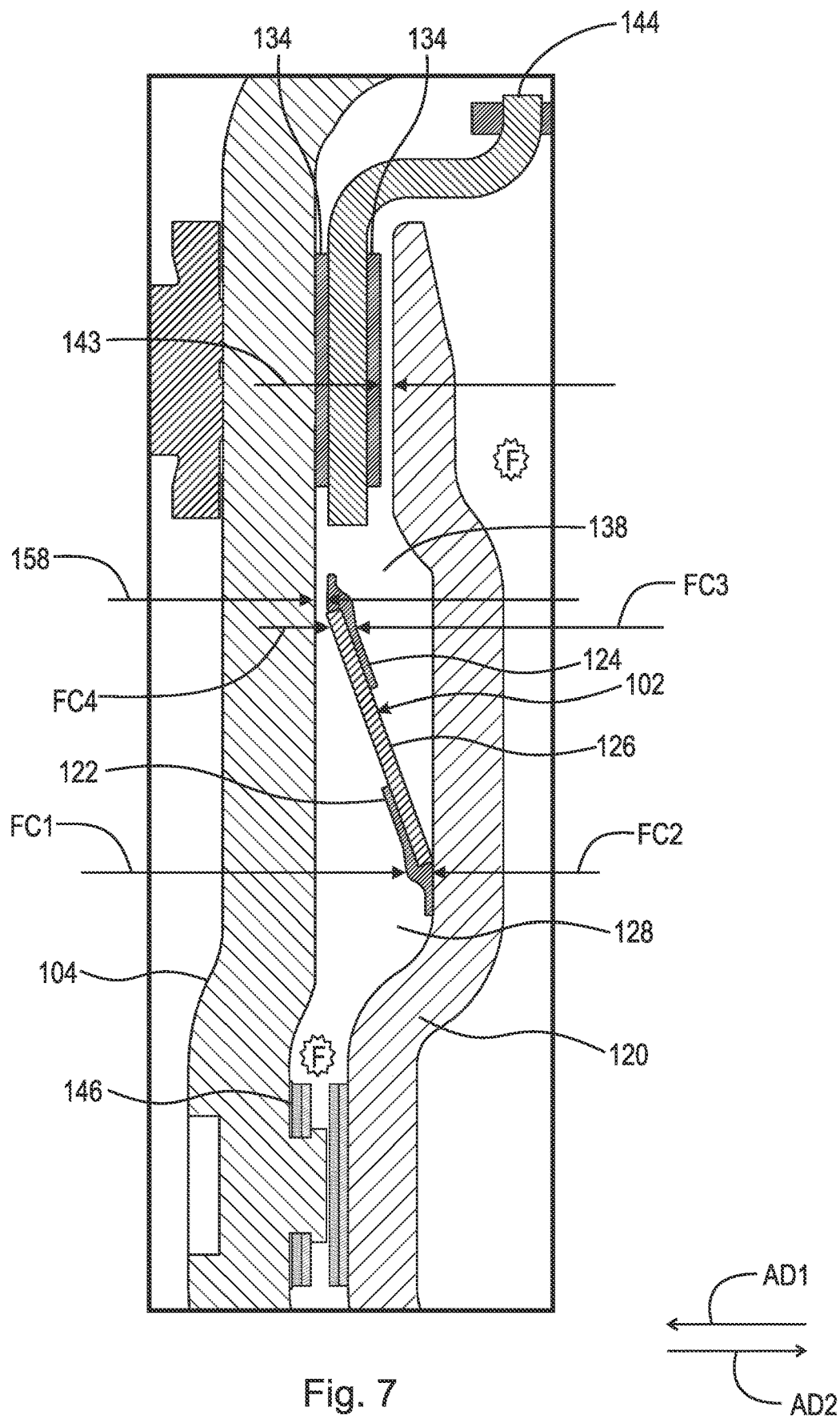
FIG. 7 is a detail of area A in FIG. 6.

FIG. 7 is a detail of area A in FIG. 6.

Figure 8:
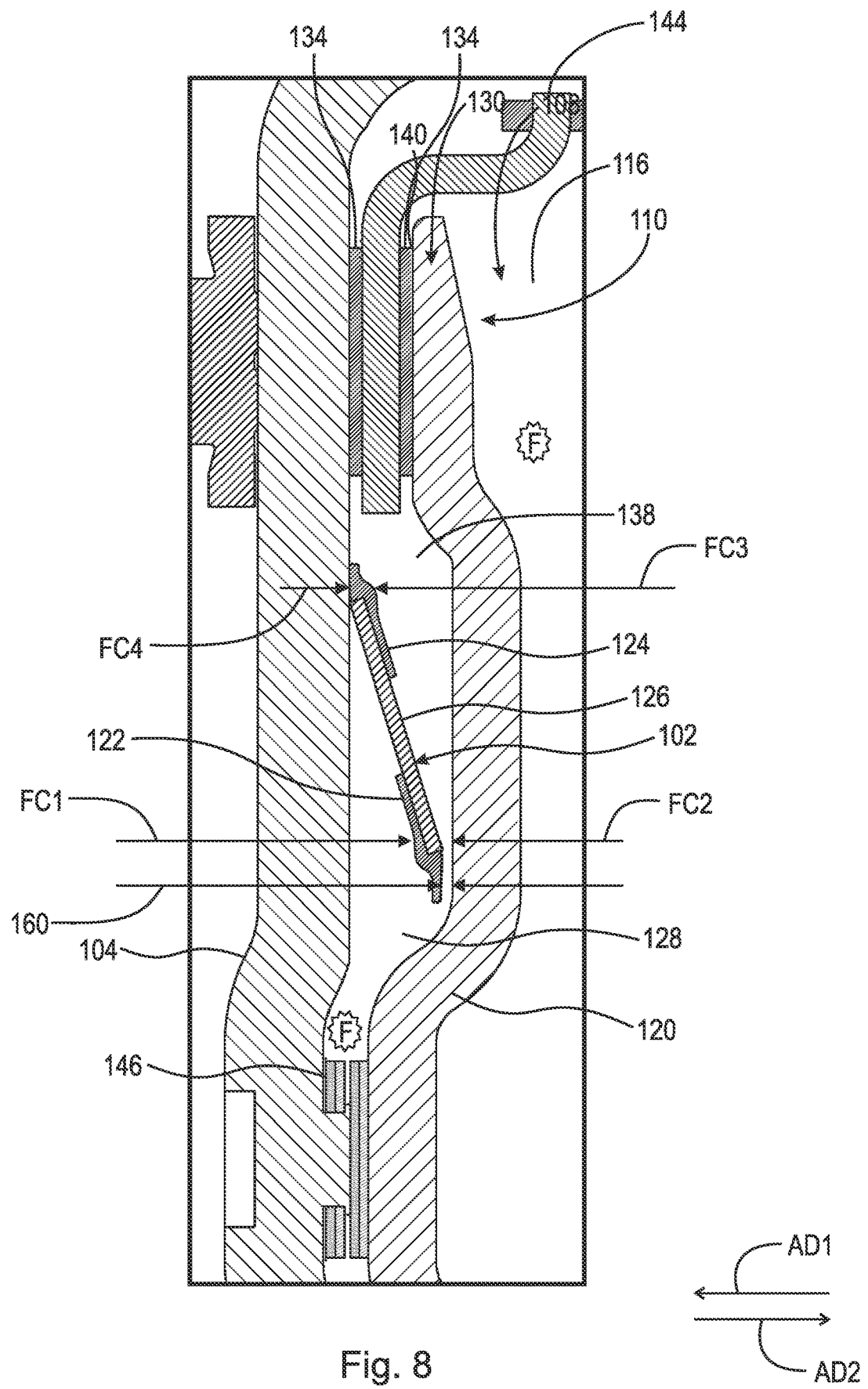
FIG. 8 is a detail of area A in FIG. 6 with the two-pass torque converter in the clutch closed mode; and, FIG. 9 is a detail of area A in FIG. 6 with the two-pass torque converter in a transition from the clutch open mode to the clutch closed mode.

FIG. 8 is a detail of area A in FIG. 6 with two-pass torque converter 100 in the clutch closed mode.

Figure 9:
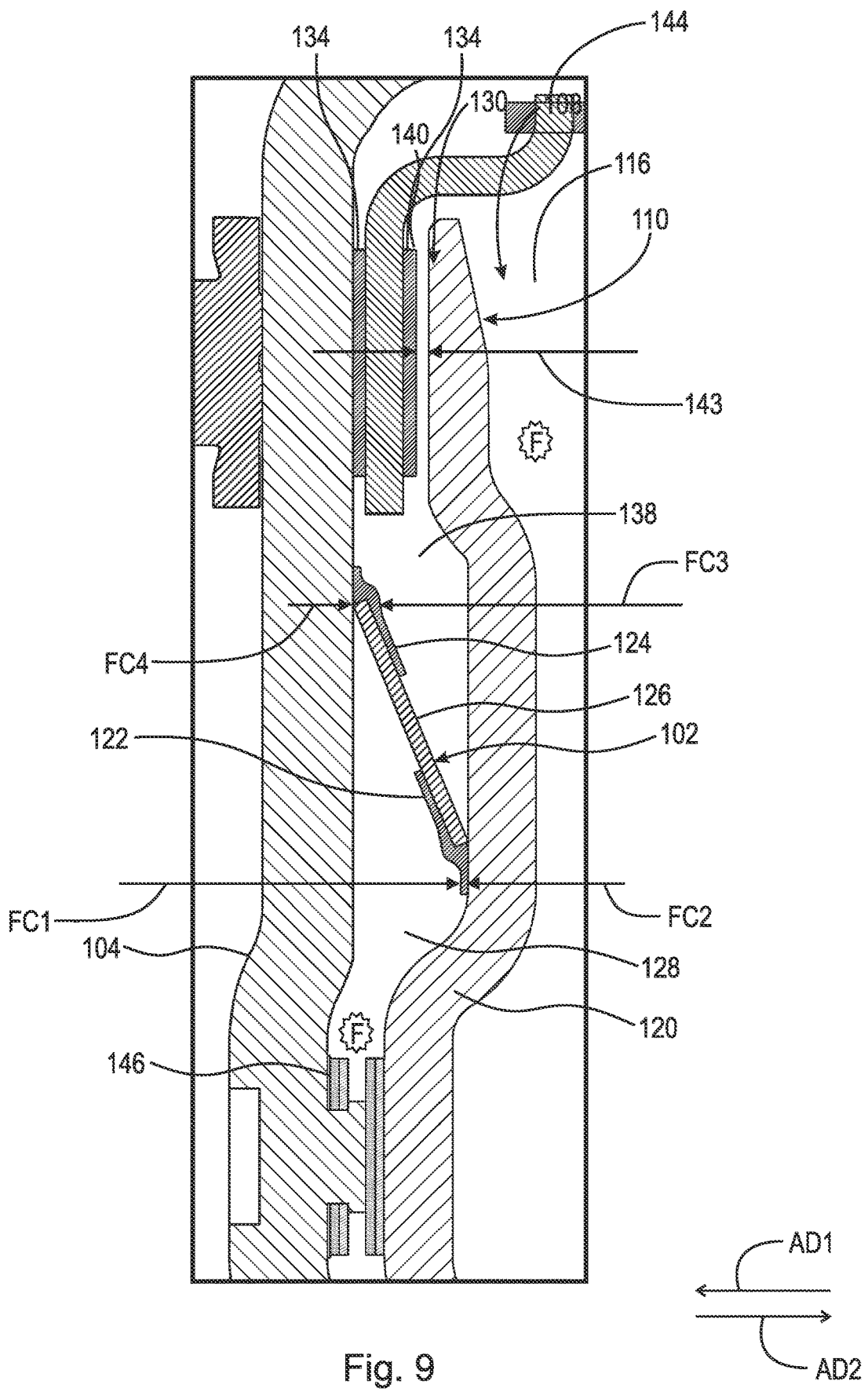

FIG. 9 is a detail of area A in FIG. 6 with two-pass torque converter 100 in a transition from the clutch open mode to the clutch closed mode. Except as noted the discussion for two-pass torque converter 100 in FIGS. 1 through 5 is applicable to two-pass torque converter 100 in FIGS. 6 through 9. The discussion above for FIGS. 1 through 5 regarding the transition from the clutch open mode to the clutch closed mode is applicable to torque converter 100 shown in FIGS. 6 through 9. In FIGS. 6 through 9: seal 124 is arranged to seal against cover 104 and define gap 158 between seal 124 and cover 104; and seal 122 is arranged to seal against piston plate 120 and define gap 160 between seal 122 and piston plate 120. The discussion for gap 141 is applicable to gap 158 and the discussion for gap 142 is applicable to gap 160. Examples of the applicability of the discussion for FIGS. 1 through 5 to FIGS. 6 through 9 are given below.

In the clutch closed mode: force FC3 is arranged to displace seal 124 into contact with cover 104 to block flow of fluid F from portion 138, between cover 104 and seal 124, and into release pressure chamber 128; and force FC2 is arranged to displace seal 122 to open gap 160 to enable flow of fluid F from portion 138, through gap 160, and into release pressure chamber 128 to cool clutch 110.

In the clutch open mode: force FC4 is arranged to displace seal 124 out of contact with cover 104 to open gap 158 and enable flow of fluid F from release pressure chamber 128 into portion 138 and portion 140 to cool torus; and force FC1 is arranged to displace seal 122 into contact with piston plate 120 to block flow of fluid F from release pressure chamber 128, between seal 122 and piston plate 120, and into portion 138.

The following discussion presents example pressures solely for the purpose of illustrating a transition from the clutch open mode to the clutch closed mode of torque converter 100. It is understood that torque converter 100 is not limited to these pressures and that other pressures are possible in torque converter 100. The transition from the clutch open mode to the clutch closed mode occurs substantially as follows:

1. Starting from FIG. 7 (torque converter 100 is in a steady state clutch open mode) fluid F flows through channel CH1 of input shaft IS, into release pressure chamber 128, through gap 158, into portion 138 and through gap 143 into portion 140. Fluid pressure in release pressure chamber 128 is 8 bar and fluid pressure in apply pressure chamber 130 is 7.5 bar.
2. Chamber 128 is depressurized to approximately zero bar by reversing the flow of fluid F from CH1. Fluid F flows into apply pressure chamber 130 from channel CH2, formed by input shaft IS and stator shaft SS.
3. Staying in FIG. 7, due to loss of fluid pressure in release pressure chamber 128, spring force FC3 overcomes force FC4, closing gap 158, resulting in the configuration of FIG. 9.
4. In FIG. 9, fluid F flows from portion 140 through gap 143 and into portion 138 with little resistance.
5. Flow of fluid F from portion 138 into release pressure chamber 128 is blocked by seal 122 and force FC1, and by force FC3 and seal 124. Thus, fluid pressure builds in portion 138, gap 143 remains open, and fluid pressure in release pressure chamber 128 remains approximately zero.
6. Staying in FIG. 9, when pressure in portion 138 builds up to the point where force FC2 equals force FC1, and pressure in release pressure chamber 128 remains approximately zero bar, the fluid pressure differential between chambers 128 and 130 continues to displace piston 120 in direction AD1 with up to a pressure differential of 0.5 bar to close gap 143 in clutch 110.
7. Seal 122 remains sealed against cover 104 until fluid pressure in portion 138 reaches 0.5 bar at which point force FC2 overcomes force FC1 from spring 126, forming gap 160 as shown in FIG. 8.
8. Fluid F flows from portion 140, through slots 136, through portion 138, through gap 160, through release pressure chamber 128, and into channel CH1 of input shaft IS.
9. In the steady state of FIG. 8, fluid F continues to flow: from portion 140 through slots 136; through portion 138; through gap 160; and into release pressure chamber 128, The flow of fluid F into release pressure chamber 128 is constricted by gap 160, creating a fluid back pressure at the interface of portion 140 and friction material 134, which creates a maximum fluid pressure in portion 140, clamping clutch 110 closed and enabling full transmission of torque RT to output element 111. Fluid pressure in release pressure chamber 128 remains at approximately zero bar, fluid pressure in portion 138 is 0.5 bar, and fluid pressure in portion 140 is 8 bar.

The following should be viewed in light of FIGS. 1 through 9. The following describes a method of operating two-pass torque converter 100 including: flow control assembly 102; cover 104, impeller 106, turbine 108, lock-up clutch 110, and output element 111, Although the method is presented as a sequence of steps for clarity, no order should be inferred from the sequence unless explicitly stated. A first step receives, with cover 104, rotational torque RT. For the clutch open mode a second step: holds clutch 110 open with fluid F in release pressure chamber 128; and transmits rotational torque RT from cover 104 to output element 111 via impeller 106 and turbine 108. For the clutch closed mode, a third step: holds clutch 110 closed with fluid F in apply pressure chamber 130; and transmits rotational torque RT from cover 104 to output element 111 via lock-up clutch 110. For a first stage of a transition from the clutch open mode to the clutch closed mode, a fourth step: flows at least a portion of fluid F in release pressure chamber 128 into channel CH1; flows fluid F from portion 140 into portion 138; blocks, with spring 126, seal 122, and seal 124, a flow of fluid F from portion 138 into release pressure chamber 128; and displaces, with fluid F in portion 140, piston plate 120 toward cover 104.

For the first stage of the transition from the clutch open mode to the clutch closed mode, a fifth step: holdings, with spring 126, seal 122 against cover 104 and seal 124 against piston plate 120; or holds, with spring 126, seal 122 against piston plate 120 and seal 124 against cover 104. For a second stage of the transition from the clutch open mode to the clutch closed mode, a sixth step: when seal 122 is held against cover 104 in the first stage, displaces, with fluid F in portion 138, seal 122 out of contact with cover 104, and flows fluid F from portion 138 through gap through gap 142 between seal 122 and cover 104 and into release pressure chamber 128; or when seal 122 is held against piston plate 120 in the first stage, displaces, with fluid F in portion 138, seal 122 out of contact with piston plate 120, and flows fluid F from portion 138 through gap 160 between seal 122 and piston plate 120 and into release pressure chamber 128.

For the clutch open mode, a seventh step: holds, with fluid F in release pressure chamber 128, seal 124 out of contact with one of cover 104 or piston plate 120; flows fluid F from release pressure chamber 128, between seal 124 and the one of cover 104 or piston plate 120, and into portion 138; and holds, with fluid F in release pressure chamber 128, seal 122 in contact with the other of cover 104 or piston plate 120.

For the transition from the clutch open mode to the clutch closed mode, torque converter 100 with flow control assembly 102, and a method of using torque converter 100 with flow control assembly 102, provide a controlled, repeatable, and restricted flow of fluid F from chamber 130 into chamber 128, such that the pressure differential between chambers 128 and 130 is sufficient to ensure a controlled, repeatable and predictable displacement of piston plate 120 and transition to the clutch closed mode. In the clutch closed mode: the controlled and limited build-up of fluid pressure in portion 138 creates the back pressure noted above, while the controlled flow of fluid F through gap 142 or gap 160 prevents excessive fluid pressure build-up in portion 138, and provides cooling of clutch 110. In the clutch open mode, flow through gaps 141 and 158 provides cooling of torus 132.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

AD1 axial direction
AD2 axial direction
AR axis of rotation
CH1 channel
CH2 channel
IS transmission input shaft
F fluid
FC1 force
FC2 force
FC3 force
FC4 force
RT rotational torque
SS stator shaft
100 two-pass torque converter
102 flow control assembly
104 cover
106 impeller
108 turbine
110 lock-up clutch
111 output element
112 impeller shell
114 impeller blade
116 turbine shell
118 turbine blade
120 piston plate
122 seal
124 seal
125 spring
128 release pressure chamber
130 apply pressure chamber
132 torus
134 friction material
136 slot, friction material
138 portion, release pressure chamber
140 portion, release pressure chamber
141 gap
142 gap
143 gap
144 outer clutch plate
146 leaf spring
147 stator
148 one clutch
150 pendulum vibration damper
152 stator blade
154 input element
155 output flange
158 gap
160 gap

The invention claimed is:
1. A two-pass torque converter, comprising:
a cover arranged to receive torque;
an impeller including:
an impeller shell connected to the cover; and,
at least one impeller blade fixedly connected to the impeller shell;
a turbine including:
a turbine shell; and,
at least one turbine blade fixedly connected to the turbine shell;
a lock-up clutch including a piston plate;
an output element arranged to non-rotatably connect to a transmission input shaft; and,
a flow control assembly including:
a first seal; and,
a spring connected to the first seal and urging the first seal toward one of the cover or the piston plate, wherein:
the cover, the piston plate, and the flow control assembly define, at least partly, a release pressure chamber;
the cover, the impeller shell, the piston plate, and the flow control assembly define, at least partly, an apply pressure chamber;
in a clutch open mode of the two-pass torque converter, the torque is arranged to be transmitted from the cover to the output element via the impeller and the turbine;
the flow control assembly includes a second seal connected to the spring;
the spring urges the second seal toward another of the cover or the piston plate; and, in the clutch open mode:
a fluid in the release pressure chamber is arranged to flow between the first seal and the one of the cover or the piston plate and into the apply pressure chamber; and,
the fluid in the release pressure chamber is arranged to urge the second seal into contact with the another of the cover or the piston plate.

2. The two-pass torque converter of claim 1, wherein: the lock-up clutch includes a friction material axially disposed between the cover and the piston plate;
the cover, the friction material, the piston plate, and the flow control assembly define, at least partly, a first portion of the apply pressure chamber; and,
the cover, the impeller shell, the piston plate, and the friction material define, at least partly, a second portion of the apply pressure chamber.

3. The two-pass torque converter of claim 1, wherein: in the clutch open mode of the two-pass torque converter, the fluid in the release pressure chamber is arranged to flow from the release pressure chamber into the apply pressure chamber;
in a clutch closed mode of the two-pass torque converter, the torque is arranged to be transmitted from the cover to the output element via the lock-up clutch, and the fluid in the apply pressure chamber is arranged to flow from the apply pressure chamber into the release pressure chamber; and
the piston plate is axially displaceable to shift the two-pass torque converter between the clutch open mode and the clutch closed mode.

4. The two-pass torque converter of claim 3, wherein in the clutch open mode, the fluid in the release pressure chamber is arranged to flow around the flow control assembly.

5. The two-pass torque converter of claim 3, wherein in the clutch open mode:
the spring is arranged to urge the second seal into contact with the another of the cover or the piston plate; and,
the second seal is arranged to block a flow of the fluid, in the release pressure chamber, between the second seal and the another of the cover or the piston plate and into the apply pressure chamber.

6. The two-pass torque converter of claim 3, wherein: the spring urges the first seal toward the piston plate; and, in the clutch open mode:
the fluid in the release pressure chamber is arranged to flow between the first seal and the piston plate and into the apply pressure chamber; and,
the fluid in the release pressure chamber is arranged to urge the second seal into contact with the cover.

7. The two-pass torque converter of claim 3, wherein: the spring urges the first seal toward the cover; and, in the clutch open mode:
the fluid in the release pressure chamber is arranged to flow between the first seal and the cover and into the apply pressure chamber; and,
the fluid in the release pressure chamber is arranged to urge the second seal into contact with the piston plate.

8. The two-pass torque converter of claim 3, wherein in the clutch closed mode, the fluid in the apply pressure chamber is arranged to flow around the flow control assembly and into the release pressure chamber.

9. The two-pass torque converter of claim 3, wherein in the clutch closed mode:
the fluid in the apply pressure chamber is arranged to flow between the first seal and the one of the cover or the piston plate and into the release pressure chamber;
the fluid in the apply pressure chamber is arranged to urge the second seal into contact with the another of the cover or the piston plate; and,
the second seal is arranged to block flow of the fluid, in the apply pressure chamber, between the second seal and the another of the cover or the piston plate and into the release pressure chamber.

10. The two-pass torque converter of claim 3, wherein the spring urges the first seal toward the piston plate; and, in the clutch closed mode:
the fluid in the apply pressure chamber is arranged to flow between the second seal and the cover and into the release pressure chamber; and,
the fluid in the apply pressure chamber is arranged to urge the first seal into contact with the piston plate.

11. The two-pass torque converter of claim 3, wherein: the spring urges the first seal toward the cover; and, in the clutch closed mode:
the fluid in the apply pressure chamber is arranged to flow between the second seal and the piston plate and into the release pressure chamber; and,
the fluid in the apply pressure chamber is arranged to urge the first seal into contact with the cover.

12. The two-pass torque converter of claim 3, wherein during a transition from the clutch open mode to the clutch closed mode:
the fluid in the apply pressure chamber is arranged to urge the first seal into contact with the one of the cover or the piston plate;
the first seal is arranged to block a flow of the fluid, in the apply pressure chamber, between the first seal and the one of the cover or the piston plate and into the release pressure chamber;
the spring is arranged to urge the second seal into contact with the another of the cover or the piston plate; and
the second seal is arranged to block a flow of the fluid, in the apply pressure chamber, between the second seal and the another of the cover or the piston plate.

13. The two-pass torque converter of claim 1, wherein the first seal is located radially outward of the second seal.

14. A two-pass torque converter, comprising:
a cover arranged to receive torque;
an impeller including:
an impeller shell connected to the cover; and,
at least one impeller blade fixedly connected to the impeller shell;
a turbine including:
a turbine shell; and,
at least one turbine blade fixedly connected to the turbine shell;
a lock-up clutch including a piston plate;
an output element arranged to non-rotatably connect to a transmission input shaft; and,
a flow control assembly axially disposed between the cover and the piston plate and including:
a first seal; and,
a spring connected to the first seal and urging the first seal toward one of the cover or the piston plate, wherein:
the cover, the flow control assembly, and the piston plate define, at least partly, a release pressure chamber;

the cover, the impeller shell, the piston plate, and the flow control assembly define, at least partly, an apply pressure chamber;
the flow control assembly includes a second seal connected to the spring;
the spring urges the second seal toward another of the cover or the piston plate; and,
in a clutch closed mode of the two-pass torque converter:
the torque is arranged to be transmitted from the cover to the output element via the lock-up clutch;
a fluid in the apply pressure chamber is arranged to flow between the first seal and the one of the cover or the piston plate and into the release pressure chamber; and,
the fluid in the apply pressure chamber is arranged to urge the second seal into contact with the another of the cover or the piston plate.

15. The two-pass torque converter of claim 14, wherein:
in the clutch closed mode of the two-pass torque converter:
the second seal and the another of the cover or the piston plate define a gap; and,
the fluid in the apply pressure chamber is arranged to flow through the gap and into the release pressure chamber.

16. The two-pass torque converter of claim 14, wherein in a clutch open mode of the two-pass torque converter:
the torque is arranged to be transmitted from the cover to the output element via the turbine;
the second seal is arranged to seal against the another of the cover or the piston plate;
the first seal and the one of the cover or the piston plate define a gap; and,
the fluid in the release pressure chamber is arranged to flow through the gap and into the apply pressure chamber.

17. The two-pass torque converter of claim 14, wherein:
in a clutch open mode of the two-pass torque converter, the torque is arranged to be transmitted from the cover to the output element via the turbine; and,
during a transition from the clutch open mode to the clutch closed mode:
the spring and the fluid in the apply pressure chamber are arranged to urge the first seal into contact with the one of the cover or the piston plate;
the first seal is arranged to block a flow of the fluid, in the apply pressure chamber, between the first seal and the one of the cover or the piston plate;
the spring is arranged to urge the second seal into contact with the another of the cover or the piston plate; and
the second seal is arranged to block a flow of the fluid, in the apply pressure chamber, between the second seal and the another of the cover or the piston plate.

18. A method of operating a two-pass torque converter including a cover, an impeller with an impeller shell connected to the cover, a turbine with a turbine shell, a lock-up clutch including a piston plate and friction material axially disposed between the cover and the piston plate, an output element, and a flow control assembly including a spring, a first seal connected to the spring, and a second seal connected to the spring, the method comprising:
receiving, with the cover, a rotational torque;
urging, with the spring, the first seal toward one of the cover or the piston plate;
urging, with the spring, the second seal toward another of the cover or the piston plate;
for a clutch open mode:
holding the lock-up clutch open with a fluid in a release pressure chamber defined at least in part by the cover, the flow control assembly, and the piston plate; and,
transmitting the rotational torque from the cover to the output element via the impeller and the turbine;
for a clutch closed mode:
holding the lock-up clutch closed with the fluid in an apply pressure chamber, the apply pressure chamber defined at least in part by the cover, the impeller shell, the piston plate, and the flow control assembly; and,
transmitting the rotational torque from the cover to the output element via the lock-up clutch;
for a first stage of a transition from the clutch open mode to the clutch closed mode:
flowing out at least a portion of the fluid in the release pressure chamber;
flowing the fluid from a first portion of the apply pressure chamber into a second portion of the apply pressure chamber, the first portion of the apply pressure chamber defined at least in part by the impeller shell and the friction material, and the second portion of the apply pressure chamber defined, at least in part, by the cover, the friction material, the piston plate, and the flow control assembly;
blocking, with the first seal and the second seal, a flow of the fluid in the second portion of the apply pressure chamber into the release pressure chamber; and,
displacing, with the fluid in the first portion of the apply pressure chamber, the piston plate toward the cover; and,
for the clutch open mode:
flowing the fluid from the release pressure chamber, between the first seal and the one of the cover or the piston plate, and into the second portion of the apply pressure chamber; and,
holding, with the fluid in the release pressure chamber, the second seal in contact with the another of the cover or the piston plate.

19. The method of claim 18, further comprising:
for the first stage of the transition from the clutch open mode to the clutch closed mode:
holding, with the spring, the first seal against the cover and the second seal against the piston plate; or,
holding, with the spring, the first seal against the piston plate and the second seal against the cover; and,
for a second stage of the transition from the clutch open mode to the clutch closed mode:
when the first seal is held against the cover in the first stage, displacing, with the fluid in the second portion of the apply pressure chamber, the first seal out of contact with the cover, and flowing the fluid from the second portion of the apply pressure chamber between the first seal and the cover and into the release pressure chamber; or,
when the first seal is held against the piston plate in the first stage, displacing, with the fluid in the second portion of the apply pressure chamber, the first seal out of contact with the piston plate and flowing the fluid from the second portion of the apply pressure chamber between the first seal and the piston plate and into the release pressure chamber.

20. The method of claim 18, further comprising:
for the clutch open mode, holding, with the fluid in the release pressure chamber, the first seal out of contact with the one of the cover or the piston plate.

* * * * *